United States Patent [19]

Inukai et al.

[11] Patent Number: 4,596,667
[45] Date of Patent: Jun. 24, 1986

[54] LIQUID CRYSTALLINE COMPOUNDS AND MIXTURES THEREOF

[75] Inventors: Takashi Inukai, Yokohamashi; Kenji Furukawa, Yokosukashi; Kanetsugu Terashima; Shinichi Saito, both of Yokohamashi, all of Japan

[73] Assignee: Chisso Corporation, Osaka, Japan

[21] Appl. No.: 568,060

[22] Filed: Jan. 4, 1984

[30] Foreign Application Priority Data

Jan. 6, 1983 [JP] Japan .................................. 58-00640
May 4, 1983 [JP] Japan .................................. 58-78594

[51] Int. Cl.[4] .......................... C09K 3/34; C07C 69/76; C07C 69/74
[52] U.S. Cl. ................................ 252/299.65; 252/299.5; 252/299.63; 252/299.66; 252/299.67; 350/350 R; 350/350 S; 560/1; 560/59; 560/61; 560/72; 560/73; 560/102; 560/106; 560/107; 560/108; 560/109; 560/118; 558/270
[58] Field of Search ........................ 252/299.63, 299.67, 252/299.65, 299.66, 299.5; 350/350 S, 350 R; 560/1, 59, 61, 55, 102, 106, 107, 108, 109, 118, 72, 73; 260/463

[56] References Cited

U.S. PATENT DOCUMENTS

| | | | |
|---|---|---|---|
| 3,975,286 | 8/1976 | Oh ................................. | 252/299.01 |
| 4,065,489 | 12/1977 | Steinstrasser et al. ......... | 252/299.65 |
| 4,083,797 | 4/1978 | Oh ................................. | 252/299.66 |
| 4,113,647 | 9/1978 | Coates et al. ................... | 252/299.63 |
| 4,149,413 | 4/1979 | Gray et al. ..................... | 252/299.64 |
| 4,195,916 | 4/1980 | Coates et al. ................... | 252/299.64 |
| 4,208,106 | 6/1980 | Oh ................................. | 252/299.1 |
| 4,222,887 | 9/1980 | Matsufuji ....................... | 252/299.63 |
| 4,229,315 | 10/1980 | Krause et al. .................. | 252/299.63 |
| 4,257,911 | 3/1981 | Gray et al. ..................... | 252/299.65 |
| 4,341,653 | 7/1982 | Inukai et al. ................... | 252/299.63 |

FOREIGN PATENT DOCUMENTS

| | | | |
|---|---|---|---|
| 87032 | 2/1983 | European Pat. Off. ........ | 252/255.63 |
| 87102 | 8/1983 | European Pat. Off. ........ | 252/299.63 |
| 110299 | 6/1984 | European Pat. Off. ........ | 252/299.67 |
| 136725 | 4/1985 | European Pat. Off. ........ | 252/299.65 |
| 136845 | 4/1985 | European Pat. Off. ........ | 252/299.65 |
| 105701 | 5/1974 | German Democratic Rep. ............................... | 252/299.63 |
| 5387986 | 8/1978 | Japan ............................. | 252/299.65 |
| 5388677 | 8/1978 | Japan ............................. | 252/299.67 |
| 5763380 | 4/1982 | Japan ............................. | 252/299.65 |
| 5813546 | 1/1983 | Japan ............................. | 252/299.63 |

OTHER PUBLICATIONS

C.A., vol. 95, 104173m (1981).
Goodby, J. W., et al., Liquid Crystals and Ordered Fluids, vol. 4, Griffin, A. C., et al., Ed., Plenum press, N.Y. pp. 1–32 (1984).
C.A., 96, 133710k (1982).
C.A., 93, 86116x (1980).
Gray, G. W., et al., Mol Cryst. Liq. Cryst. vol. 37, pp. 189–211, 157–188 (1976).
Gray, G. W., et al., Mol. Cryst. Liq. Cryst. vol. 34 (Letters), pp. 211–217 (1977).
Klanderman, D. M., et al., JACS, vol 97, No. 6, pp. 1585–1586 (1975).

Primary Examiner—Teddy S. Gron
Attorney, Agent, or Firm—Fred Philpitt

[57] ABSTRACT

Novel ferroelectric liquid crystalline compounds having a superior stability and chiral, smectic liquid crystalline compositions containing at least one kind of the same are provided, which compounds are expressed by the general formula

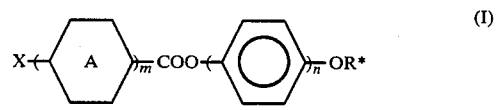
(I)

wherein

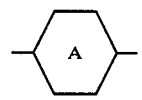

represents 1,4-phenylene group

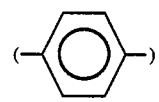

or 1,4-trans-cyclohexane group

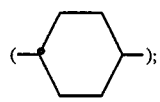

;

R*, an optically active alkyl group; m=o, 1 or 2; n=1 or 2; X, a linear chain or branched alkyl group or alkoxy group, each having 1 to 18 carbon atoms; and when

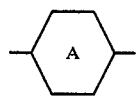

represents

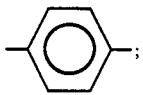

;

m=1; and n=1, X represents a linear chain or branched alkyl group having 1 to 18 carbon atoms or a linear chain alkoxy group having 11 to 18 carbon atoms.

3 Claims, No Drawings

LIQUID CRYSTALLINE COMPOUNDS AND MIXTURES THEREOF pounds, the following compounds (1) to (4) have been known up to the present (ph. Martino Lagarde, J. de Physique, 37, C3-129 (1976)):

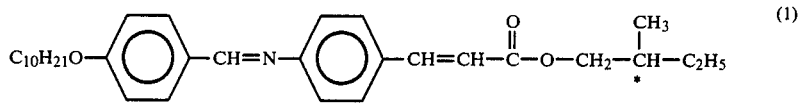

(1)

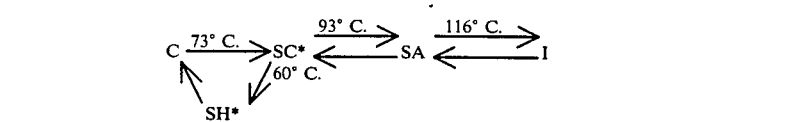

(2)

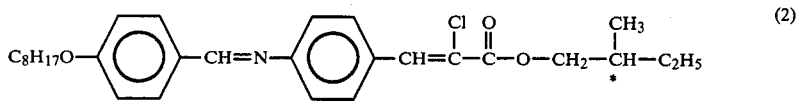

(3)

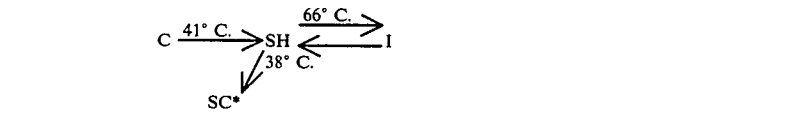

(4)

BACKGROUND OF THE INVENTION

1. Field of the Invention

This invention relates to novel liquid crystalline compounds and liquid crystalline mixtures containing the same, and more particularly, it relates to chiral smectic compounds which have a high response rate and are superior as a ferroelectric liquid cyrstalline material, and also to chiral smectic mixtures containing the same.

2. Description of the Prior Art

Twisted nematic (TN) type display mode has currently been most widely employed as liquid crystal display elements, but it is inferior in the response rate as compared with emissive type display elements such as electroluminescence, plasma display, etc., and various attempts for overcoming this drawback have been made, but, nevertheless, it seems that its improvement to a large extent has not been left behind. Thus, various liquid crystal display equipments based on different principles in place of TN type display elements have been attempted, and as one of them, there is a display mode utilizing ferroelectric liquid crystals (N. A. Clark and S. T. Layerwall, Applied Phys. lett., 36,899 (1980)). This mode utilizes the chiral smectic C phase (hereinafter abbreviated to SC* phase) or chiral smectic H phase (hereinafter abbreviated to SH* phase) of ferroelectric liquid crystals. As such ferroelectric liquid crystal com- In the foregoing, C represents crystalline phase; SA, smectic A phase; I, isotropic liquid phase; SC* and SH*, as described above; and "*", asymmetric carbon atom.

Further, as ferroelectric liquid crystal compounds, the following two compounds (5) and (6) have also been known:

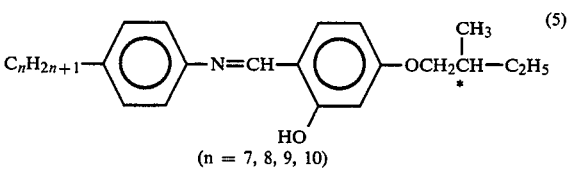

(5)

(n = 7, 8, 9, 10)

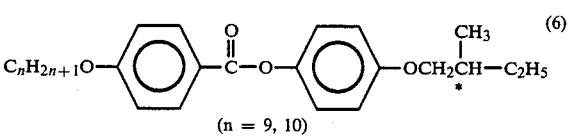

(6)

(n = 9, 10)

(B. I. Ostrovski, A. Z. Rabinovich, A. S. Sonin, E. L. Sorkin, B. A. Strukov, and S. T. Taraskin; Ferroelectrics, 24, 309 (1980)).

Among these compounds, since the compounds (1) to (4) have C=C double bond and azomethine group, they have drawbacks of being inferior in light resistance and water resistance. The compounds (5) also have azomethine group and hence are inferior in water resistance. The compounds (6) do not have these bonds and hence are superior in stability, but the above Ostrovski et al's article discloses as to their phase transition temperatures, only that the upper limit temperatures of SC* phase are 324.8° K. (in the case of n=9) and 326.2° K. (in the case of n=10), but nothing is disclosed therein as to other liquid crystalline phase modifications.

The present inventors have investigated and studied various compounds including the above compounds (1) to (6) and as a result, have found ferroelectric liquid crystal compounds having a superior stability.

SUMMARY OF THE INVENTION

The present invention resides in:
compounds expressed by the general formula

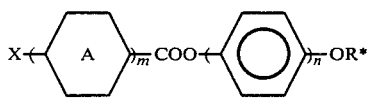

wherein

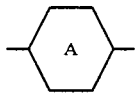

represents 1,4-phenylene group

or 1,4-trans-cyclohexane group

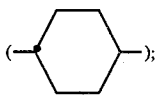

R*, an optically active alkyl group; m=o, 1 or 2; n=1 or 2; X, a linear chain or branched alkyl group or alkoxy group, each having 1 to 18 carbon atoms; and when

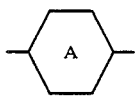

represents

m=1; and n=1, X represents a linear chain or branched alkyl group having 1 to 18 carbon atoms or a linear chain alkoxy group having 11 to 18 carbon atoms, and chiral smectic liquid crystalline compositions containing at least one kind of the same.

The compounds of the above formula (I) include those exhibiting SC* phase, alone, those exhibiting SC* phase and SA phase, those exhibiting three phases of SC* phase, SA phase and Ch phase (cholesteric phase), those exhibiting SA phase and Ch phase, etc., that is, they are a group of compounds exhibiting physically very diversified liquid crystalline phases.

DETAILED DESCRIPTION OF THE INVENTION

As for the R* in the above formula (I), i.e. optically active alkyl group, currently commercially readily available compounds containing the group, as raw material, are optically active 2-methylbutyl alcohol in the first place and optically active 2-octanol in the second place; thus 2-methylbutyl group and 2-octyl group are suitable as the group.

Among the compounds of the present invention, particularly important compounds are those which exhibit SC* phase suitable for displays using ferroelectric liquid crystals. Namely, compounds corresponding to the above are those of the formula (I) wherein R* is 2-methylbutyl;

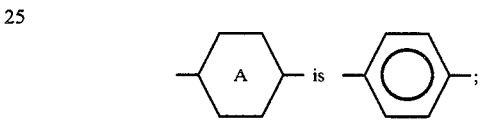

m=1; n=2; and X represents a linear chain alkyl group or alkoxy group. These compounds do not exhibit SA phase at higher temperatures than those at which SC* phase having ferroelectric properties is existent, but exhibit chloesteric phase (Ch phase). This is particularly preferably when they are employed for display elements using ferroelectric liquid crystals. A reason thereof is that when display elements are produced, liquid crystals are aligned in cholesteric state and then cooled; hence it is possible to directly form SC* phase not via other phases, to thereby easily obtain an aligned liquid crystalline phase having a high uniformity. Another reason is that rather in the case where SA phase is absent at higher temperatures than those at which SC* phase is existent, than in the case where SA phase is present at the above higher temperatures, the temperature change in the direction of the helical axis of SC* phase is small to thereby reduce the temperature change in the contrast of displays, down to a negligible small extent.

On the other hand, compounds of the formula (I) wherein

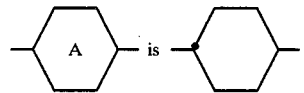

have a strong tendency of exhibiting SA phase in place of SC*.

On the other hand, compounds of the formula (I) wherein m is zero have drawbacks that temperatures at which they exhibit SC* phase are within a lower and narrower temperature range as compared with compounds of the formula (I) wherein m is 1 or 2, but since the former compounds also have lower melting point, they are effective for lowering the freezing points of SC* liquid crystalline compositions and also extending the lower limits of SC* liquid crystalline temperature ranges.

Further, compounds of the formula (I) wherein m is 1;

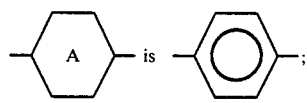

and n is 1, also have generally rather lower temperatures and are suitable as a component of liquid crystalline compositions exhibiting a liquid crystalline state in the vicinity of room temperature. Further, compounds of the formula (I) wherein m is 2;

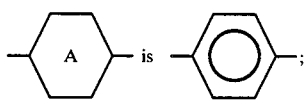

and n is 1, have relatively high melting points as compared with the above compounds wherein m is 1 and others are the same as above, but they also have a specific feature of exhibiting a liquid crystalline phase up to high temperatures and hence are suitable for extending the upper limits of the temperature ranges of liquid crystalline compositions. Furthermore, compounds of the formula (I) wherein m is 1 and others are the same as above have cholesteric phase when $X=C_7H_{15}O$ or lower and compounds of the formula (I) wherein m is 2 and others are the same as above have the phase when $X=C_3H_7O$ or lower; hence by suitably mixing these compounds, it is possible to easily obtain liquid crystalline compositions having cholesteric phase on the higher temperature side of smectic phase and also exhibiting SC* phase in the vicinity of room temperature.

When SC* liquid crystalline compositions are formed, it is possible to form them from a plurality of compounds of the formula (I), alone, and it is also possible to prepare liquid crystalline compositions exhibiting SC* phase, by mixing compounds of the formula (I) with other smectic liquid crystals.

When the light switching effect of the SC* phase is applied to display elements, the resulting display elements have the following three superior specific features:

The first specific feature is that the elements reply at a very high rate and the response times are 1/100 or less of those of display elements according to the usual TN display mode.

The second specific feature is that the elements have a memory effect; hence multiplex drive is easy in combination of this effect with the above-mentioned high rate response properties.

The third specific feature is that gray scale in TN display mode is attained by controlling the impressed voltage applied to display elements, but this is accompanied with difficult problems of the temperature depency of threshold voltage value and the voltage dependency of response rate. However, in the case where the light switching effect of SC* phase is applied to the display elements, it is possible to easily attain the gray scale by controlling the switching time of polarity; hence the display elements are very suitable for graphic display.

As for the display modes, the following two may be considered:

One mode is of birefringence type using two pieces of polarizers and another is of guest-host type using dichloric dyestuffs. Since SC* phase has a spontaneous polarization, molecules reverse around the helical axis thereof as a revolving axis by reversing the polarity of impressed voltage. A liquid crystal composition having SC* phase is filled into a liquid crystal display cell subjected to an aligning treatment so that liquid crystal molecules can align in parallel to the surface of electrodes, followed by placing the liquid crystal cell between two pieces of polarizers arranged so that the director of the liquid crystal molecules can be in parallel to the polarization plane on another side, impressing a voltage and reversing the polarity to be thereby able to obtain a bright field and a dark field (determined by the opposed angles of polarizers). On the other hand, in the case where display elements are operated in guest-host mode, it is possible to obtain bright field and colored field (determined by the arrangement of polarization sheets) by reversing the polarity of impressed voltage.

In general, it is difficult to align liquid crystal molecules in smectic state in parallel to the wall surface of glass; hence liquid crystal molecules have been aligned by cooling them very slowly (e.g. 1°~2° C./hr) initially starting from their isotropic liquid, in a magnetic field of several tons Kilogauss or more, but in the case of liquid crystal substances having cholesteric phase, the substances are cooled at a cooling rate of 1° C./min. under impression of a direct current voltage of 50 to 100 V in place of magnetic field, whereby it is possible to easily obtain a monodomain state where liquid crystal molecules are uniformly aligned.

Compounds of the formula (I) also have an optically active carbon atom; hence when they are added to nematic liquid crystals, they have a performance of having a twisted structure induced in the mixtures. Nematic liquid crystals having a twisted structure, i.e. chiral nematic liquid crystals, form no reverse domain (striped pattern); hence it is possible to use the compounds of the formula (I) as an agent for preventing reverse domain. Compounds suitable for such an application field are those which by themselves exhibit cholesteric phase, and examples thereof are compounds of the formula (I) wherein R* represents 2-methylbutyl;

m, 1;n, 2; and X, an alkoxy group having 4 carbon atoms or less in the main chain, and compounds of the formula (I) wherein n represents 1; X, an alkoxy group of 8 carbon atoms or less; and the remaining symbols, the same as above. When these compounds are added to nematic liquid crystals in an amount of about 0.05 to 3% by weight based on the latter, a twisting force in the definite direction is imparted to molecules so that the resulting nematic liquid crystals are free from the reverse domain.

Compounds of the formula (I) wherein m=1 or 2;

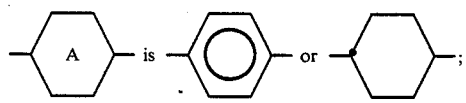

and n=1 may be prepared according to such steps as described below. The compounds may be most suitably prepared by first reacting hydroquinonemono (optically active 2-methylbutyl) ether with a corresponding carboxylic acid halide such as p-alkoxybenzoic acid halides, 4-(p-alkoxyphenyl)-benzoic acid halides, 4-(p-alkylphenyl)benzoic acid halides, trans-4-alkylcyclohexanecarboxylic acid halides, trans-4-alkoxycyclohexanecarboxylic acid halides, etc., in a basic solvent such as pyridine. The hydroquinonemono (optically active 2-methylbutyl) ether may be prepared from hydroquinone and optically active 2-methylbutyl halide or optically active 2-methylbutyl-p-toluenesulfonic acid ester according to a conventional method.

Compounds of the formula (I) wherein m=0,1 or 2;

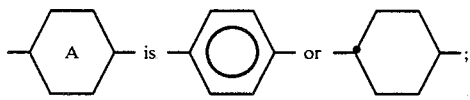

and n=2 may be prepared according to such steps as described below. The compounds may be prepared by first mono-etherifying 4,4'-dihydroxybiphenyl with an optically active alkylhalide or an optically active alkyl p-toluenesulfonic acid ester according to a conventional method to obtain a 4,4'-dihydroxydiphenyl monoether

which is then reacted with fatty acid halide, chloroformic acid ester, p-alklybenzoic acid halide, p-alkoxybenzoic acid halide, trans-4-alkylcyclohexanecarboxylic acid halide, 4'-alkyl-4-biphenylcarboxylic acid halide, 4'-alkoxy-4-biphenylcarboxylic acid halide or the like, corresponding to the respective final objective compounds, in a basic solvent represented by pyridine to obtain the objective products.

Liquid crystal compounds and liquid crystal compositions of the present invention will be further described in detail by way of Examples.

EXAMPLE 1

Preparation of p-n-dodecyloxybenzoic acid-p'-(2-methylbutyloxy)phenyl ester (compounds of the formula (I) wherein m=1;

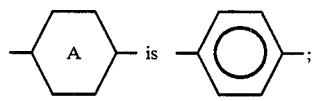

n=1; R*=2-methylbutyl; and X=n—$C_{12}$—$H_{25}O$)

(I) Preparation of optically active hydroquinonemono (2-methylbutyl)ether

Optically active p-toluenesulfonic acid 2-methylbutyl ester was first prepared according to a conventional method i.e. by reacting p-toluenesulfonic acid chloride with (−)2-methylbutanol in pyridine.

Next, into a solution obtained by dissolving hydroquinone (248 g) and potassium hydroxide (88 g) in water (30 ml) and ethanol (2 l) was added the above p-toluenesulfonic acid 2-methylbutyl ester (366 g) and the mixture was heated with stirring at 60° C. for 2 hours and then under reflux for 7 hours, followed by distilling off ethanol (1.7 l), adding water (1.9 l) and 6N hydrochloric acid for acidification to separate a brown oily substance, extracting this substance with heptane (150 ml), water-washing the resulting heptane layer, distilling it under reduced pressure to obtain a fraction of b.p. 115°~135° C.(2.5 mmHg) (176 g), dissolving this fraction in heptane (300 ml), subjecting the solution to extraction with 1N aqueous solution of KOH (1 l), washing the resulting extract liquid with heptane (100 ml), adding 6N hydrochloric acid to the alkaline aqueous layer for acidification to separate an oily substance, water-washing this substance, and distilling it under reduced pressure to obtain a fraction of b.p. 107°~111° C. (2 mmHg) (140 g), dissolving this fraction in hexane (200 ml), and keeping the solution at 0° C. for crystal deposition to obtain optically active hydroquinonemono (2-methylbutyl) ether (m.p. 41°~42° C.) (129 g).

(II) Esterification p-n-Dodecyloxybenzoic acid (8 g) together with thionyl chloride (20 ml) were heated under reflux for 2 hours, followed by distilling off excess thionyl chloride to obtain p-n-dodecyloxybenzoic acid chloride, which was made up into a toluene solution thereof without any particular purification. On the other hand, optically active hydroquinonemono (2-methylbutyl) ether (4.7 g) obtained above in the item (I) was dissolved in pyridine (30 ml). To this solution kept at 0° C. was dropwise added the toluene solution of p-n-dodecyloxybenzoic acid chloride obtained above, followed by heating the mixture at 90° C. for 2 hours for reaction, separating the resulting esterified substance in a conventional manner, and twice repeating recrystallization to obtain colorless crystals of p-n-dodecyloxybenzoic acid p'-(2-methylbutyloxy)phenyl ester (C-SC* point, 50.5° C.; SC*-SA point, 51.2° C.; SA-I point, 65° C.; and $[\alpha]_D^{25°}=+5.2°$ (as measured in chloroform solution)) (6.5 g). Further its elemental analysis values accorded well with its theoretical values as follows:

|   | Analytical values | Theoretical values (as $C_{30}H_{44}O_4$) |
| --- | --- | --- |
| C | 76.6% | 76.88% |
| H | 9.6% | 9.46% |

EXAMPLES 2-21

Compounds of the formula (I) wherein m=1 or 2;

and n=1 were prepared as in Example 1 except that p-n-dodecyloxybenzoic acid chloride was replaced by various kinds of p-alkyloxybenzoic acid chlorides, 4'-alkyl-4-biphenylcarboxylic acid chlorides, or 4'-alkyloxy-4-biphenylcarboxylic acid chlorides. The physical properties of the compounds obtained are shown together with the results of Example 1 in Table 1. In addition, R* of the formula (I) in this Table all refers to optically active 2-methylbutyl group.

TABLE 1

| | In formula (I) | | | | Phase transition point (°C.) | | | | |
|---|---|---|---|---|---|---|---|---|---|
| Ex. | X | A | m | n | C | S₃ | SC* | SA | Ch | I |
| 2 | n-C₄H₉O | (cyclohexyl-phenyl) | 1 | 1 | . 77 | — | — | — | (. 40)* | . |
| 3 | n-C₆H₁₃O | " | 1 | " | . 63 | — | — | (. 45.5) | (. 53.5) | . |
| 4 | n-C₇H₁₅O | " | 1 | " | . 53 | — | — | (. 48) | (. 52) | . |
| 5 | n-C₈H₁₇O | " | 1 | " | . 47.1 | — | (. 42.7) | . 58.5 | — | . |
| 6 | n-C₉H₁₉O | " | 1 | " | . 45 | — | . 47 | . 59 | — | . |
| 7 | n-C₁₀H₂₁O | " | 1 | " | . 45.5 | — | . 50 | . 63 | — | . |
| 8 | n-C₁₁H₂₃O | " | 1 | " | . 48 | — | . 50 | . 63 | — | . |
| 1 | n-C₁₂H₂₅O | " | 1 | " | . 50.5 | — | . 51.2 | . 65 | — | . |
| 9 | n-C₁₃H₂₇O | " | 1 | " | . 59 | — | (. 50) | . 66 | — | . |
| 10 | n-C₁₄H₂₉O | " | 1 | " | . 56 | — | — | . 65 | — | . |
| 11 | n-CH₃O | " | 2 | " | . 120 | — | — | . 164 | . 213.5 | . |
| 12 | n-C₃H₇O | " | 2 | " | . 133.5 | — | — | . 173 | . 183 | . |
| 13 | n-C₆H₁₃O | " | 2 | " | . 111.5 | — | (. 91.5) | . 196 | — | . |
| 14 | n-C₇H₁₅O | " | 2 | " | . 103 | . 106 | . 116 | . 182.5 | — | . |
| 15 | n-C₈H₁₇O | " | 2 | " | . 102.5 | — | . 150 | . 189 | — | . |
| 16 | n-C₉H₁₉O | " | 2 | " | . 99 | — | . 157 | . 186 | — | . |
| 17 | n-C₁₀H₂₁O | " | 2 | " | . 95.5 | . 99 | . 152 | . 182 | — | . |
| 18 | n-C₁₂H₂₅O | " | 2 | " | . 90 | — | . 150 | . 175 | — | . |
| 19 | n-C₁₈H₃₇O | " | 2 | " | . 100 | — | . 128 | . 153 | — | . |
| 20 | n-C₇H₁₅ | " | 2 | " | . 96 | — | — | . 161.5 | — | . |
| 21 | n-C₈H₁₇ | " | 2 | " | . 88 | — | — | . 157 | — | . |

In the column of "phase transition point" of the above Table, $S_3$ represents a smectic phase whose identity is unclear; "." and numeral figures on the right side of "." represent the temperature of phase transition from the phase corresponding thereto to a phase on the right side of the above phase; "—" means that the phase is not exhibited; "( )" represents a monotropic phase transition temperature; and "*" represent approximate values obtained by extrapolation method.

EXAMPLE 22 (USE EXAMPLE 1)

A liquid crystal composition consisting of

| 4-ethyl-4'-cyanobiphenyl | 20 parts by weight |
|---|---|
| 4-pentyl-4'-cyanobiphenyl | 40 parts by weight |
| 4-octyloxy-4'-cyanobiphenyl | 25 parts by weight |
| 4-pentyl-4'-cyanoterphenyl | 15 parts by weight | was filled in a cell consisting of transparent electrodes (distance therebetween: about 10 μm) subjected to parallel aligning treatment by applying polyvinyl alcohol thereonto and rubbing the resulting surface to prepare a TN type display cell, and when this cell was observed with a polarizing microscope, formation of a reverse domain was observed.

To the above nematic liquid crystal composition was added a compound of the formula (I) wherein m=1;

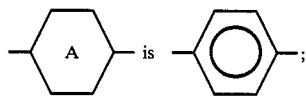

n=1; X=C₈H₁₇O; and R*=2-methylbutyl, in an amount of 0.1% by weight. From this mixture was similarly prepared a TN cell, which was then observed, and as a result it was observed that the reverse domain disappeared and a uniform nematic phase was exhibited.

EXAMPLE 23 (USE EXAMPLE 2)

Compounds of the formula (I) wherein m=1;

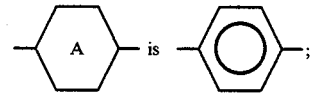

n=1; R* is 2-methylbutyl; and X=n—C₈H₁₇O, n—C₉H₁₉O, n—C₁₀H₂₁O, n—C₁₂H₂₅O, or n—C₁₄H₂₉O were respectively mixed in equal amount. The mixtures exhibited SC* phase up to 40° C., exhibited SA phase at higher temperatures than 40° C. and this SA phase became an isotropic liquid at 62° C. directly, not via cholesteric phase.

Each of the mixtures was filled in a cell subjected to aligning treatment by applying an oblique evaporation of silica onto the surfaces of the electrodes to align liquid crystal molecules in parallel to the surfaces of the electrodes (the distance therebetween: 10 μm). The resulting cell was placed between polarizers in a perpendicularly crossed Nicol state, arranged so that the director of liquid crystal molecules could be in parallel to a polarization plane on another side, and an alternating current voltage of low frequency (0.5 Hz, 5 V) was impressed. As a result, a clear switching effect was observed, and liquid crystal display elements having a very good contrast and a high response rate (several m sec) were obtained.

EXAMPLE 24 (USE EXAMPLE 3)

Five compounds of the formula (I) wherein m=1;

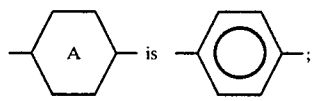

n=1; R*=2-methylbutyl; and X=n—C$_8$H$_{17}$O, n—C$_{11}$H$_{23}$O, n—C$_{12}$H$_{25}$O, n—C$_{13}$H$_{27}$O or n—C$_{14}$H$_{29}$O (the respective weights of these compounds being 4 parts, 4 parts, 4 parts, 4 parts and 3 parts) were mixed with three compounds of the formula (I) wherein m=2;

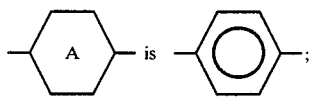

n=1; R*=2-methylbutyl; and X=n—C$_8$H$_{17}$O, n—C$_{10}$H$_{21}$O or n—C$_{12}$H$_{25}$O (the respective weights of these compounds being one part, 2 parts and one part). Each of these mixtues exhibited SC* phase up to 45° C., exhibited SA phase above 45° C. and became an isotropic liquid at 80°~82° C. directly not via cholesteric phase.

To this mixture was added a dyestuff of anthraquinone group, D-16 (a product of BDH company) in an amount of 3% by weight to prepare a composition of the so-called guest-host type. This was then filled in the same cell as in Example 3, and one piece of a polarizer was so arranged that its polarization plane was perpendicular to the axis of molecules. When an alternating current (0.5 Hz, 5 V) was impressed, a clear switching effect was observed and a color liquid display element having a very good contrast and a high response rate (several m sec) was obtained.

EXAMPLE 25 (USE EXAMPLE 4)

A mixture of a compound of the formula (I) wherein m=1;

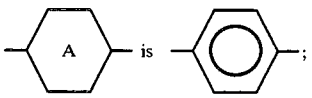

n=1; R*=2-methylbutyl; and X=n—C$_8$H$_{17}$O (85 parts), with a compound of the formula (I) wherein m=2;

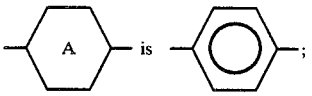

n=1; R*=2-methylbutyl; and X=n—C$_6$H$_{13}$O (15 parts), exhibited SC* phase up to 43° C., exhibited SA phase at temperatures above 43° C., and this SA phase turned to cholesteris phase (Ch phase) at 57° C. and became an isotropic phase at 74° C.

This mixture was filled in a cell provided with transparent electrodes subjected to parallel aligning treatment by applying PVA onto the surfaces of electrodes and rubbing the resulting surfaces, and while a direct current voltage of 50 V was impressed to the cell in the temperature range exhibiting Ch phase, it was slowly cooled till it exhibited SC* phase, to obtain a uniform monodomain cell. When this liquid crystal cell was placed between two pieces of polarizers arranged so as to give a perpendicularly crossed Nicol state, and an alternating current voltage of low frequency (15 V, 0.5 Hz) was impressed to the cell, a clear switching effect was observed and a color liquid crystal element having a very good contrast and a high response rate (1 m sec or less).

In addition, the value of the spontaneous polarization of this liquid crystal composition, P$_s$ was 3 nC/cm$^2$.

EXAMPLE 26 (Use Example 5)

Four compounds of the formula (I) wherein m=1;

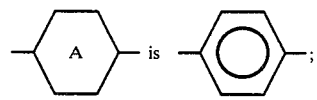

n=1; R*=2-methylbutyl; and X=n—C$_8$H$_{17}$O, n—C$_9$H$_{19}$O, n—C$_{10}$H$_{21}$O or n—C$_{12}$H$_{25}$O (each 20% by weight) were mixed with two compounds of the formula (I) wherein m=2;

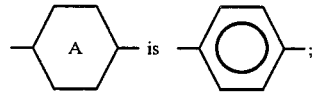

n=1; R*=2-methylbutyl; and X=n—C$_6$H$_{13}$O or n—C$_8$H$_{17}$O (each 10% by weight). The resulting mixture exhibited SC* phase up to 51° C., exhibited SA phase at temperatures above 51° C., and this SA phase became an isotropic liquid at 75° C. directly not via cholesteric phase.

This mixture was filled in the same cell as in Use Example 3, and the resulting cell was placed between two pieces of polarizers arranged to as to give a perpendicularly crossed Nicol state, and when an alternate current of 15 V and low frequency (0.5 Hz) was impressed, a clear switching effect was observed and a liquid crystal display element having a very good contrast and a high response rate (1 m sec or less) was obtained.

In addition, its P$_s$ value was 2 nC/cm$^2$ and its tilt angle was 20° in the range of 20° C.~40° C.

EXAMPLE 27 (USE EXAMPLE 6)

A liquid crystal composition consisting of a compound of the formula (I) wherein m=1;

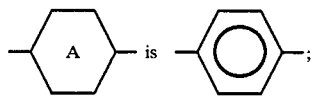

n=1; R*=2-methylbutyl; and X=C$_8$H$_{17}$O (one part) and as other smectic compounds,

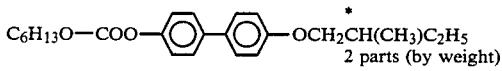
2 parts (by weight)

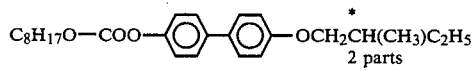
2 parts

-continued

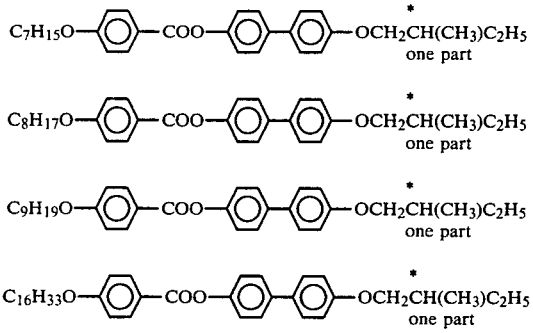

exhibited SC* phase up to 70° C., exhibited Ch phase above 70° C. and became an isotropic liquid at 105° C. That is, it is a composition exhibiting no SA phase. To this liquid crystal composition was added a dyestuff of anthraquinone group, D-16 (made by BDH company), in an amount of 3% by weight to prepare a liquid crystal composition of the so-called guest-host type. This composition was filled in the same as in Example 25, and while a direct current voltage of 50 V was impressed in the temperature range of Ch phase, the cell was slowly cooled, to obtain a uniform monodomain. This liquid crystal cell was provided with two pieces of polarizers arranged so that the polarization plane could be perpendicular to the axis of molecules, and when an alternating current voltage of 15 V and low frequency (0.5 Hz) was impressed, a clear switching effect was observed and a liquid crystal display element having a very good contrast and a high response rate (1 m sec or less) was obtained.

EXAMPLE 28

Preparation of 4'-(2-methylbutyloxy)-4-n-pentanoyloxybiphenyl (a compound of the formula (I) wherein m=0;

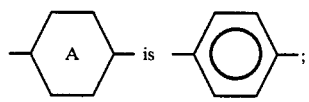

n=2; R*=2-methylbutyl; and X=n—$C_4H_9$)

(i) Preparation of 4'-(2-methylbutyloxy)-4-hydroxybiphenyl

A mixture of 4,4'-dihydroxybiphenyl (500 g), ethanol (7.5 l) and KOH (302 g) was heated under reflux with stirring, and (+) 2-methylbutyl bromide (prepared from (−)2-methylbutanol with phosphorus bromide) (530 g) was dropwise added for 4 hours to react them, followed by distilling off ethanol, adding water (2 l), filtering, collecting an insoluble substance, and treating this insoluble substance with toluene to remove a soluble substance. This soluble part was recrystallized from ethanol to give scaly crystals of m.p. 80.5° C., which was confirmed to be di-(2-methylbutyloxy)-biphenyl. On the other hand, the above insoluble part was heated together with hydrochloric acid with stirring, followed by cooling, collecting the resulting solid substance and recrystallizing it from toluene and then from ethanol to obtain 4'-(2-methylbutyloxy)-4-hydroxybiphenyl of m.p. 137.5° C. (125 g).

(ii) Preparation of subject compound

4'-(2-Methylbutyloxy)-4-hydroxybiphenyl (5.1 g) obtained above in the item (i) was dissolved in pyridine and cooled with water. To this solution was dropwise added with stirring a toluene solution of valeic acid chloride (2.5 g), followed by reacting them at 60° C. for one hour, adding ice and 6N hydrochloric acid for acidification, washing with water, distilling off toluene, and recrystallizing the residue from ethanol to obtain the objective 4'-(2-methylbutyloxy)-4-n-pentanoyloxybiphenyl (4.2 g) having a m.p. of 86° C., which exhibited SB phase through monotropic phase transition at 85° C. (see Table 2). Its chemical structure was confirmed by NMR and elemental analyses.

EXAMPLES 29–46

Example 28 was repeated except that valeic acid chloride was replaced by various kinds of fatty acid chlorides, chloroformic acid alkyl, p-alkylbenzoic acid chloride, p-alkyloxy benzoic acid chloride, trans-4-alkylcyclohexanecarboxylic acid chloride, 4'-alkyl-4-biphenylcarboxylic acid chloride or 4'-alkyloxy-4-biphenylcarboxylic acid chloride, to obtain compounds of the formula (I) wherein m=0, 1 or 2; n=2; and

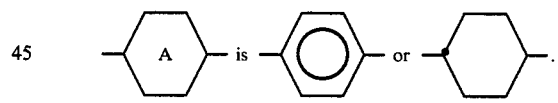

The physical properties of these compounds are shown in Table 2 together with the results of Example 28.

TABLE 2

| | In formula (I) | | | | | Phase transition point (°C.) | | | | |
|---|---|---|---|---|---|---|---|---|---|---|
| Example | X | R* | —⟨A⟩— | m | n | C | SB | SC* | SA | Ch | I |
| 28 | n-$C_4H_9$ | 2-methylbutyl group | — | 0 | 2 | . 86 | . 85 | — | — | — | . |
| 29 | n-$C_6H_{13}O$ | " | — | 0 | " | . 49 | — | (. 46) | — | — | . |
| 30 | n-$C_8H_{17}O$ | " | — | 0 | " | . 55 | — | (. 47) | — | (. 49.5) | . |
| 31 | n-$C_9H_{19}O$ | " | — | 0 | " | . 59 | — | (. 46) | — | (. 49) | . |
| 32 | n-$C_5H_{11}$ | " | phenyl | 1 | " | . 99.5 | — | (. 91) | — | . 49 | . |
| 33 | n-$C_7H_{15}$ | " | " | 1 | " | . 80 | — | . 97.5 | — | . 166 | . |
| 34 | n-$C_8H_{17}$ | " | " | 1 | " | . 85.5 | — | . 105 | — | . 151.5 | . |

TABLE 2-continued

| | In formula (I) | | | | | | Phase transition point (°C.) | | | | |
|---|---|---|---|---|---|---|---|---|---|---|---|
| Example | X | R* | A | m | n | C | SB | SC* | SA | Ch | I |
| 35 | n-C$_{10}$H$_{21}$ | " | " | 1 | " | — unclear | — | . 109 | — | . 149.5 | . |
| 36 | n-C$_4$H$_9$O | " | " | 1 | " | . 113 | — | — | — | . 141 | . |
| 37 | C$_2$H$_5$CH(CH$_3$)CH$_2$O | " | " | 1 | " | . 105 | — | — | — | . 195 | . |
| 38 | n-C$_7$H$_{15}$O | " | " | 1 | " | . 83 | — | . 122 | — | . 148.5 | . |
| 39 | n-C$_8$H$_{17}$O | " | " | 1 | " | . 81 | — | . 130.5 | — | . 175 | . |
| 40 | n-C$_9$H$_{19}$O | " | " | 1 | " | . 82 | — | . 125 | — | . 160 | . |
| 41 | n-C$_{16}$H$_{33}$O | " | " | 1 | " | . 90.5 | — | . 132 | — | . 142 | . |
| 42 | n-C$_8$H$_{17}$ | " | (cyclohexyl) | 1 | " | . 84.5 | — | — | . 160.5 | . 167.5 | . |
| 43 | n-C$_8$H$_{17}$O | " | (phenyl) | 2 | " | . 142 | — | . 229 | . 251 | . 281 | . |
| 44 | n-C$_8$H$_{17}$ | 2-octyl group | (phenyl) | 1 | " | . 63.2 | — | . 68.2 | — | . 91.7 | . |
| 45 | n-C$_8$H$_{17}$O | " | " | 1 | " | . 72.1 | . 68.5 | . 100.6 | — | . 125.4 | . |
| 46 | n-C$_8$H$_{17}$ | " | (cyclohexyl) | 1 | " | — | . 109.4 | — | . 110.7 | — | . |

SB shows smectic B phase.

EXAMPLE 47 (USE EXAMPLE 7)

A composition consisting of

| | |
|---|---|
| 4-ethyl-4'-cyanobiphenyl | 20 parts by weight |
| 4-pentyl-4'-cyanobiphenyl | 40 parts by weight |
| 4-octyloxy-4'-cyanobiphenyl | 25 parts by weight and |
| 4-pentyl-4'-cyanoterphenyl | 15 parts by weight | was filled in a TN cell of transparent electrodes (the distance therebetween: about 10 μm) subjected to parallel aligning treatment by applying PVA and rubbing the surfaces, and when it was observed with a polarizing microscope, a reverse domain was observed.

To this composition was added a compound of the formula (I) wherein m=0;

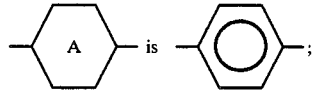

n=2, X=n—C$_4$H$_9$; and R*=2-methylbutyl (the compound of Example 28) in an amount of 1% by weight. As a result, the reverse domain disappeared and a uniform nematic phase was observed.

As other agents for preventing reverse domain, a compound of the formula (I) wherein X=n—C$_4$H$_9$O; m=1,

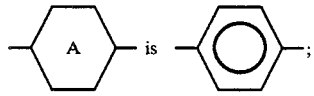

n=2; and R*=2-methylbutyl, and a compound of the formula (I) wherein X=C$_2$H$_5$—CH(CH$_3$)CH$_2$O; m=1;

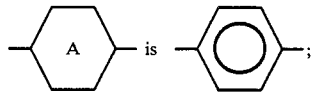

n=2; and R*=2-methylbutyl, were tested according to the same method, to obtain good results.

EXAMPLE 48 (USE EXAMPLE 8)

A mixture consisting of two compounds of the formula (I) wherein m=0;

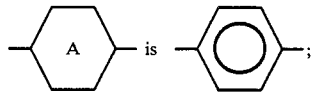

n=2; R*=2-methylbutyl; and X=C$_6$H$_{13}$O or C$_8$H$_{17}$O (each 30 parts) and two compounds of the formula (I) wherein m=1;

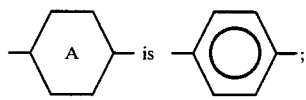

n=2; R*=2-methylbutyl; and X=C$_8$H$_{17}$O or C$_9$H$_{19}$O (each 20 parts), exhibited SC* phase up to 75° C., exhibited Ch phase at temperatures above 75° C. and became an isotropic phase at 95° C., that is, it exhibited no SA phase.

This mixture was filled between transparent electrodes (10 μm) subjected to parallel aligning treatment by applying PVA and rubbing the surfaces, and while a direct current voltage (50 V) was impressed in the temperature range of Ch phase, it was slowly cooled so as to give SC* phase. As a result, a uniform monodomain was obtained. This liquid crystal cell was placed between two pieces of polarizers arranged in a perpendicularly crossed Nicol state, and an alternating current of 15 V and a low frequency (about 0.5 Hz) was impressed. As a result, a clear switching effect was observed, and a liquid crystal display element having a very good contrast and a high response rate (1 m sec or less) was obtained.

EXAMPLE 49 (USE EXAMPLE 9)

A liquid crystal mixture consisting of two compounds of the formula (I) wherein m=0;

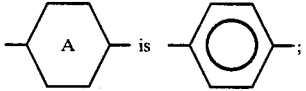

n=2; R*=2-methylbutyl; and X=n—C$_6$H$_{13}$O or n—C$_8$H$_{17}$O (each 20 parts), four compounds of the formula (I) wherein m=1;

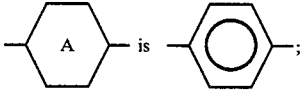

n=2; R*=2-methylbutyl; and X=n—C$_7$H$_{15}$O, n—C$_8$H$_{17}$O, n—C$_9$H$_{19}$O or n—C$_{16}$H$_{33}$O (each 10 parts) and a compound of the formula (I) wherein m=1;

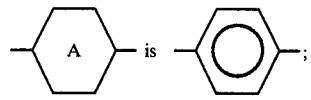

n=2; R*=2-methylbutyl; and X=n—C$_8$H$_{17}$O (10 parts), exhibited SC* phase up to 70° C., exhibited Ch phase at temperatures above 70° C. and became an isotropic liquid at 105° C., that is, it exhibited no SA phase.

To this mixture was added a dyestuff of anthraquinone group, D-16 (made by BDH Co.) in an amount of 3% by weight, to obtain a composition of the so-called guest-host type. It was then filled in the same cell as in Example 48, and one piece of a polarizer was arranged so that the polarization plane could be perpendicular to the axis of molecules. When an alternating current of 15 V and a low frequency (about 0.5 Hz) was impressed, a clear switching effect was observed, and a liquid crystal display element having a very good contrast and a high response rate (1 m sec or less) was obtained.

What we claim is:

1. An optically active smectic liquid crystal compound expressed by the formula

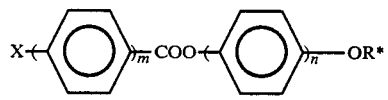

wherein
m is 1,
n is 2,
X represents an alkyl or alkoxy group, and
R* is an optically active group selected from the group consisting of 2-methylbutyl and 2-octyl.

2. A chiral, smectic liquid crystalline composition consisting of at least two components and containing at least one compound as set forth in claim 1.

3. A chiral, smectic liquid crystalline composition consisting only of a plurality of compounds having the formula set forth in claim 1.

* * * * *